United States Patent [19]

Lee

[11] Patent Number: 5,320,011

[45] Date of Patent: Jun. 14, 1994

[54] SAFETY DEVICE LATCH FOR A PAPER CUTTER

[75] Inventor: Arnold Lee, Ft. Wayne, Ind.

[73] Assignee: Martin Yale Industries, Inc., Wabash, Ind.

[21] Appl. No.: 959,211

[22] Filed: Oct. 9, 1992

[51] Int. Cl.5 .............................................. B26D 1/30
[52] U.S. Cl. .......................................... 83/13; 83/607; 83/932; 30/262
[58] Field of Search ...................... 83/607, 13, DIG. 1, 83/608, 609; 30/262

[56] References Cited

U.S. PATENT DOCUMENTS

| | | | |
|---|---|---|---|
| 614,537 | 11/1898 | Dahlquist | 30/262 X |
| 1,426,217 | 8/1922 | Rausse | 30/262 |
| 1,730,718 | 10/1929 | Bosch, Jr. | 83/545 X |
| 2,254,374 | 9/1941 | Laukhuff | 83/544 X |
| 2,495,677 | 1/1950 | Boyer | 30/262 X |
| 2,518,076 | 8/1950 | Scherig | 83/607 X |
| 2,544,197 | 3/1951 | Vosbikian et al. | 30/262 |
| 3,089,373 | 5/1963 | Fischer et al. | 83/607 X |
| 3,393,595 | 7/1968 | Halverson et al. | 83/609 X |
| 3,792,636 | 2/1974 | Pottern | 83/468 |
| 3,811,355 | 5/1974 | Cole | 83/520 |

FOREIGN PATENT DOCUMENTS 570301 1/1924 France .................... 30/262

*Primary Examiner*—Richard K. Seidel
*Assistant Examiner*—Kenneth E. Peterson
*Attorney, Agent, or Firm*—Willian Brinks Hofer Gilson & Lione

[57] ABSTRACT

A safety latch device for a paper cutter movably attached to the cutting arm of the paper cutter. The safety latch has a base catch, an arm catch and a trigger. The base catch engages with an extended portion of the base of the paper cutter to prevent a user from raising the cutting arm. The arm catch engages with a top surface of the cutting arm to prevent the safety latch from interfering with the cutting arm during operation. The trigger allows the user to disengage the base catch from the extended portion of the base so the cutting arm can be lifted.

14 Claims, 2 Drawing Sheets

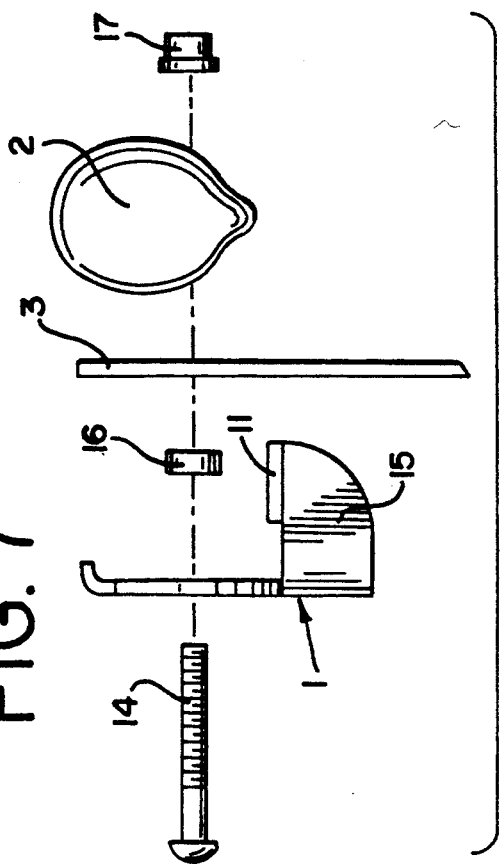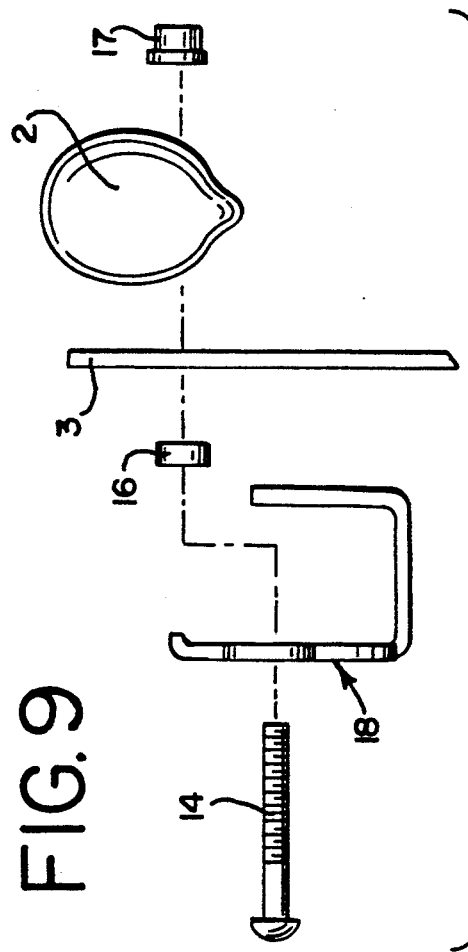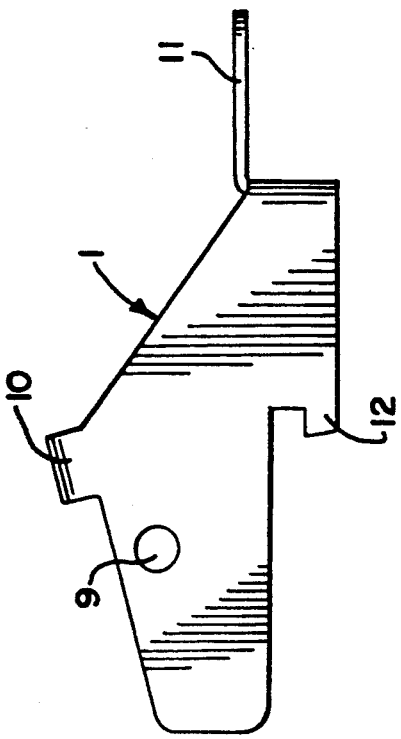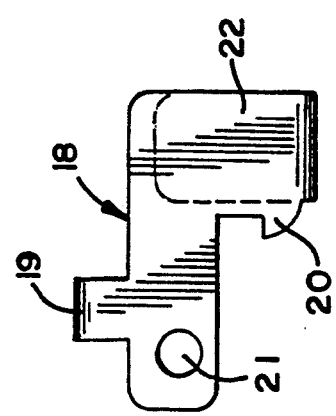

SAFETY DEVICE LATCH FOR A PAPER CUTTER

BACKGROUND OF THE INVENTION

This invention relates to a safety device latch for a paper cutter.

The problem with prior art locking devices for paper cutters is that they are not automatic, and require the user to make additional movements to lock or unlock. This decreases the efficiency of operation of the paper cutter. In addition, these locking devices require extra parts to engage with the locking device. This increases the time and labor required to assemble the paper cutter.

The present invention is directed to a safety latch for a standard paper cutter. It has few parts for easy assembly and lower cost. The present invention contains an automatic lock and trigger release and is easy to use.

SUMMARY OF THE INVENTION

The invention is a paper cutter having a safety device and method of operating the same. The safety device comprises a safety latch rotatably attached to a cutting arm having the safety latch base catch for engaging with a bottom surface of an extended portion of the base, an arm catch for engaging with the top surface of the arm, and a trigger for allowing a user to rotate the safety latch about the axis point to a position where the base catch disengages the extended base portion.

BRIEF DESCRIPTION OF THE DRAWINGS

FIG. 6 is a side elevational view of a first embodiment of the safety device.

FIG. 7 is an exploded sectional view of the first embodiment of the safety device.

FIG. 8 is a side elevational view of a second embodiment of the safety device.

FIG. 9 is an exploded sectional view of the second embodiment of the safety device.

DETAILED DESCRIPTION OF AN EMBODIMENT

Figure 1:
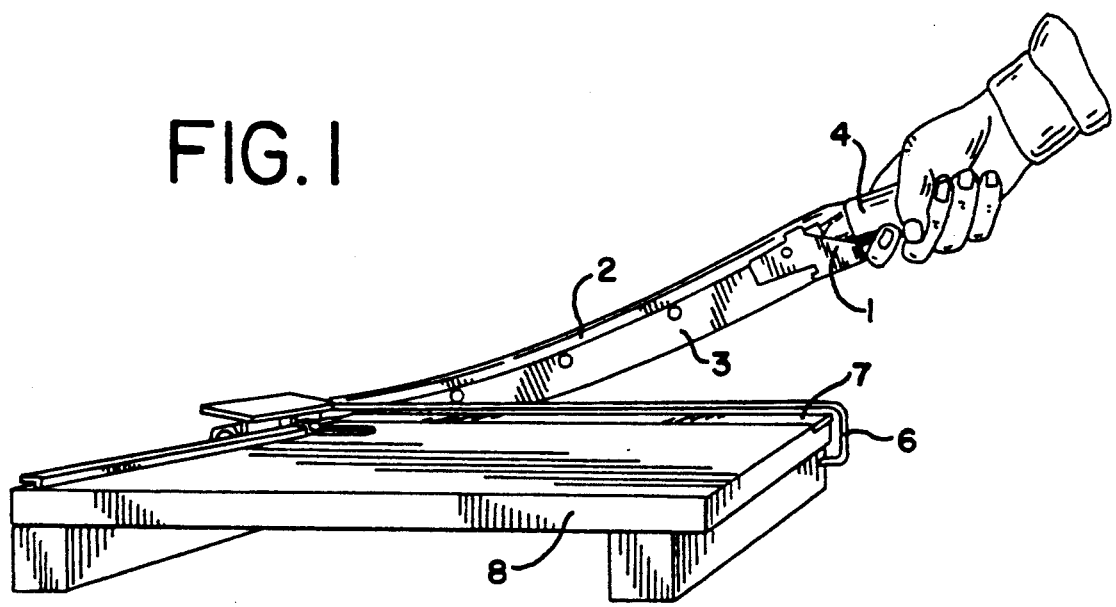
FIG. 1 is a perspective view of a paper cutter having the safety device.

Referring to FIG. 1, the paper cutter with safety latch 1 is shown in perspective view. The paper cutter has an arm 2 with a cutting arm blade 3 and handle 4. The base 8 of the paper cutter has a base blade 7 and guide 6 attached to it.

Figure 2:
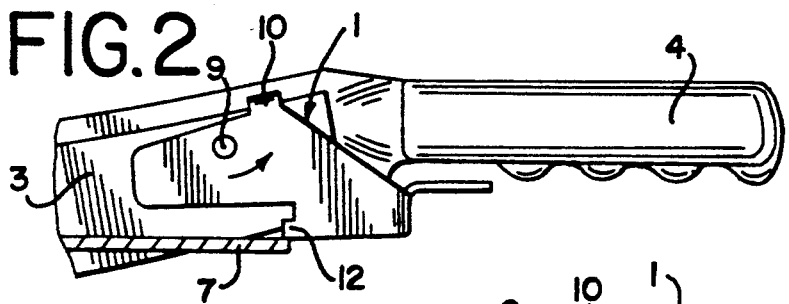
FIG. 2 is a side elevational view of the safety device in contact with the base blade.

Referring to FIG. 2 the safety latch 1 is shown in contact with one end of base blade 7 that extends beyond the edge of the base 8. The arrow indicates the slight rotation of the safety latch 1 about its axis 9 as the base catch 12 is forced against the top of the base blade 7.

Figure 3:
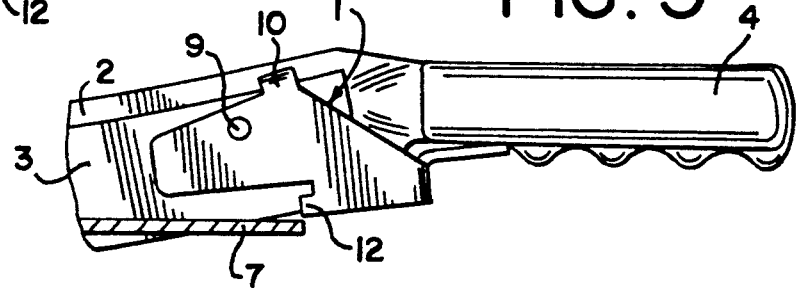
FIG. 3 is a side elevational view of the safety device rotated to allow the base catch to clear the base blade.

Referring to FIG. 3, the safety latch 1 has rotated to a position to allow the base catch 12 to clear the base blade 7 allowing the user to lift the arm 2.

Figure 4:
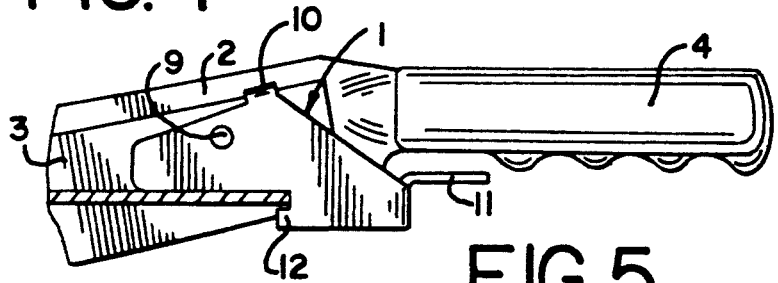
FIG. 4 is a side elevational view of the safety device in the locked position.

Referring to FIG. 4, the safety latch 1 is shown in the locked position with the top surface of the base catch contacting the bottom surface of an extended end of the base blade 7, preventing the arm 2 from being lifted.

Figure 5:
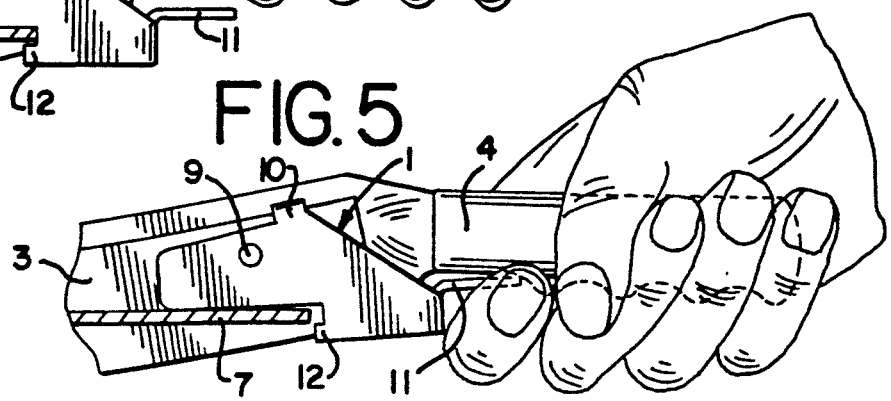
FIG. 5 is a side elevational view of the trigger of the safety device engaged by a user.

Referring to FIG. 5, the safety trigger 11 has been engaged by the user allowing the safety latch 1 to rotate about axis 9 and thus allowing the arm 2 to be lifted.

Referring to FIG. 6, a first embodiment of the safety latch is shown with an opening formed therein at the axis 9.

Referring to FIG. 7, an exploded sectional view is shown of the safety latch 1 attached to the arm blade 3 and arm 2 by screw 14 spacer 16 and nut 17. The trigger arm 15 is provided to position the trigger 11 in a comfortable position for the user beneath the handle 4.

Referring to FIG. 8, a second embodiment of the safety latch 18 is shown having arm catch 19 and base catch 20 and opening formed at the axis 21. Trigger assembly 22 is shown in phantom.

Referring to FIG. 9, an exploded sectional view is shown of the safety latch 18 attached to the arm blade 3 and arm 2 by screw 14 spacer 16 and nut 17.

In operation, the user pulls the trigger 11 up towards the bottom surface of the handle 4 rotating the safety latch counter-clockwise to allow the base catch 12 to clear the base blade 7 and the user to lift the arm 2. The user may release the trigger 11, which allows the safety latch 1 to rotate clockwise by the force of gravity. This rotation is stopped by the arm catch 10 which contacts a top surface of the arm blade 3, thus preventing any interference of the safety latch 1 with the cutting operation. As the paper or other sheet material is cut the user pushes downward on the handle 4 to force the arm 2 to a position where a bottom surface of the base catch 12 comes in contact with a top surface of an end portion of the base blade 7 that extends over the edge of the base 8. As the arm 2 is forced further down the contact of the base catch 12 with the base blade 7 causes the safety latch 1 to rotate slightly counter-clockwise about its axis 9. An opening is formed at the axis 9. The safety latch is rotatably attached to the arm blade 3 and arm 2 by a screw 14 spacer 16 and nut 17. This rotation allows the base catch 12 to clear the base blade 7 as the arm 2 is forced downward. Once the base catch 12 clears the base blade 7 the safety latch 1 rotates clockwise due to gravitational forces and locks the base catch 12 beneath the base blade 7, thus preventing upward movement of the arm 2.

One advantage of the invention is that it provides a simple, inexpensive safety device design for a paper cutter. A further advantage is that it provides a safety device with ease of use.

While the invention has been described in reference to a certain embodiment, those skilled in the art will recognize modification of structure, arrangement, composition and the like that can be made to the present invention that will fall within the scope of the invention claimed.

I claim:

1. A safety device for a paper cutter of the type having a rectangular base to support sheet material to be cut and a cutting arm pivotally connected to the base with respect to a cutting edge of the base comprising;

a safety latch having a flat body portion and a notch formed therein movably attached to the cutting arm, said latch having a base catch formed adjacent and beneath said notch for engaging with an end of a base blade attached to the rectangular base of the paper cutter, a trigger extending outward from said body portion and beneath said cutting arm for allowing the user to rotate the safety latch about an axis centered at the point of attachment to provide clearance between the base catch and the base blade, and allow the arm to be raised, and an arm catch extending outward from said body portion and above a top surface of said cutting arm for engaging with the top surface of the cutting arm to prevent the safety latch from rotating to interfere with a cutting operation when the cutting arm is in the unlocked position and the trigger is released.

2. The safety device of claim 1 wherein the safety latch is rotatably attached at an opening formed in the safety latch with a screw, a spacer, and a nut.

3. The safety device of claim 1 wherein the cutting arm comprises an arm portion and an arm blade attached to said arm portion, said top surface of said cutting arm comprising a top surface of said arm blade.

4. A paper cutter comprising:
a rectangular base having a plane top face and a metal cutting edge along one side thereof;
a cutting arm pivotally connected to said base with respect to the cutting edge;
a safety latch having a flat body with an upper portion and a lower portion formed beneath a notch formed in said body, said latch rotatably attached at an axis point to said cutting arm, said lower portion of said safety latch engaging an extended portion of said base;
a trigger attached to said body and extending outward form said body and beneath said cutting arm for disengaging said lower portion of said safety latch from said base extension by rotating said latch about said axis point.

5. The paper cutter of claim 4 wherein said safety latch and said trigger being formed as a unitary 6. The paper cutter of claim 4 wherein said safety latch catches with a top portion of said cutting arm when said trigger is released.

7. The paper cutter of claim 4 wherein said base extension comprises an extended portion of a base blade attached to said base.

8. The paper cutter of claim 4 further comprising:
an arm catch formed in said safety latch for preventing the safety latch from interfering with the cutting operation when the arm is lifted and the trigger is released.

9. The paper cutter of claim 4 wherein the flat body comprises a flat piece of metal having an arm catch formed as a unitary member with said body and extending outward from said body and above a top surface of said cutting arm.

10. The paper cutter of claim 9 wherein the cutting arm comprises an arm and an arm blade attached to said arm, said arm catch contacts a top portion of said arm blade for preventing interference of said safety latch with the arm blade during a cutting operation.

11. The paper cutter of claim 4 wherein said safety latch is movably attached to said cutting arm with a screw, a spacer and a nut.

12. A paper cutter comprising:
a base;
a cutting arm having an arm portion and an arm blade attached to said arm portion rotatably attached to said base;
a metal safety latch having a flat body portion, a bent top portion forming an arm catch, and a bent bottom portion forming a base catch, said arm catch contacts a to portion of said arm blade for preventing interference of said safety latch with the arm blade during a cutting operation, said safety latch rotatably attached at an axis point to said cutting arm, said safety latch engaging an extended portion of said base;
a trigger attached to said safety latch for disengaging said safety latch from said base extension by rotating said latch about said axis point.

13. A method of operating a paper cutter of the type having a rectangular base and a cutting arm pivotally connected to the base with respect to a cutting edge of the base comprising:
applying upward pressure to a trigger portion of a safety latch, said safety latch being movably attached to a cutting arm at an axis point for allowing the safety latch to rotate and allow a base catch portion of the safety latch to disengage from an extended portion of the base;
lifting the cutting arm for allowing sheet material to be placed in position for cutting; and
releasing the trigger and allowing the safety latch to rotate under force of gravity about the axis point until an arm catch portion of the safety latch prevents further rotation.

14. The method of claim 11 further comprising:
lowering the cutting arm to a closed position to cut the sheet material, said safety latch rotating under force of gravity to allow said base catch to engage with the extended portion of the base.

* * * * *

UNITED STATES PATENT AND TRADEMARK OFFICE
CERTIFICATE OF CORRECTION

PATENT NO. : 5,320,011
DATED : June 14, 1994
INVENTOR(S) : Arnold Lee

It is certified that error appears in the above-indentified patent and that said Letters Patent is hereby corrected as shown below:

Column 3, claim 4, line 31, delete "form" and insert --from--.

Column 3, claim 5, line 36, immediately after "unitary" insert --member.--.

Column 4, claim 12, line 9, delete "to" and insert --top--.

Signed and Sealed this

Eleventh Day of April, 1995

BRUCE LEHMAN

Attest:

Attesting Officer

Commissioner of Patents and Trademarks